United States Patent
Xia et al.

(10) Patent No.: US 8,223,873 B2
(45) Date of Patent: *Jul. 17, 2012

(54) SYSTEM AND METHOD FOR ACQUIRING BEAMFORMING VECTORS USING TRAINING SEQUENCES WITH ADAPTIVE SPREADING GAINS

(75) Inventors: Pengfei Xia, Mountain View, CA (US); Huaning Niu, Milpitas, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 982 days.

This patent is subject to a terminal disclaimer.

(21) Appl. No.: 12/144,574

(22) Filed: Jun. 23, 2008

(65) Prior Publication Data

US 2009/0046765 A1   Feb. 19, 2009

Related U.S. Application Data

(60) Provisional application No. 60/955,614, filed on Aug. 13, 2007.

(51) Int. Cl.
*H04B 7/02* (2006.01)
(52) U.S. Cl. ........ 375/267; 375/259; 375/260; 375/269; 455/132; 455/504
(58) Field of Classification Search .................... 375/267
See application file for complete search history.

(56) References Cited

U.S. PATENT DOCUMENTS 6,229,852 B1 * 5/2001 Hoang .................. 375/240.25
(Continued)

FOREIGN PATENT DOCUMENTS

EP       0537932 A2   4/1993
(Continued)

OTHER PUBLICATIONS

Van Veen et al., Beamforming: A Versatile Approach to Spatial Filtering, IEEE ASSP Magazine, Apr. 1988, 5(2): 4-24.

(Continued)

*Primary Examiner* — Chieh M Fan
*Assistant Examiner* — Santiago Garcia
(74) *Attorney, Agent, or Firm* — Kenneth L. Sherman, Esq.; Michael Zarrabian, Esq.; Sherman & Zarrabian LLP

(57) ABSTRACT

A method and system for acquiring beamforming vectors using multiple spreading sequence spreading gains is disclosed. One embodiment of the invention allows time and power to be saved by spreading a training sequence with spreading sequences of different gains in different iterations of an iterative beamforming acquisition procedure. In one embodiment of the invention, the method comprises modulating, at a first station, a first training sequence with a first source beamforming vector, wherein the first training sequence has a first spreading gain, transmitting the modulated first training sequence to a second station, receiving a first response signal from the second station, obtaining a second source beamforming vector based on the first response signal, modulating, at the first station, a second training sequence with the second source beamforming vector, wherein the second training signal has a second spreading gain which is different from the first spreading gain, transmitting the modulated second training sequence to the second station, receiving a second response signal from the second station, obtaining a third source beamforming vector based on the second response signal, and determining whether to use the third source beamforming vector to modulate a data signal to be transmitted to the second station.

23 Claims, 9 Drawing Sheets

U.S. PATENT DOCUMENTS

| | | | |
|---|---|---|---|
| 6,404,778 B1 * | 6/2002 | Hayashi et al. | 370/470 |
| 6,888,809 B1 | 5/2005 | Foschini et al. | |
| 7,860,180 B2 * | 12/2010 | Reznic et al. | 375/261 |
| 2004/0047424 A1 * | 3/2004 | Ramaswamy et al. | 375/240.27 |
| 2004/0214604 A1 * | 10/2004 | Yoon et al. | 455/562.1 |
| 2006/0146692 A1 * | 7/2006 | Gorokhov et al. | 370/208 |
| 2008/0080449 A1 * | 4/2008 | Huang et al. | 370/342 |
| 2008/0204319 A1 | 8/2008 | Niu et al. | |
| 2009/0046765 A1 | 2/2009 | Xia et al. | |
| 2009/0046798 A1 | 2/2009 | Xia et al. | |
| 2009/0141824 A1 * | 6/2009 | Xia et al. | 375/267 |

FOREIGN PATENT DOCUMENTS

| | | |
|---|---|---|
| KR | 2001/0076252 A | 8/2001 |
| KR | 2003/0083207 A | 10/2003 |
| KR | 2007/0089748 A | 8/2007 |
| WO | WO 01/43309 | 6/2001 |
| WO | WO 02/35853 A2 | 5/2002 |
| WO | WO 2006/007571 A1 | 1/2006 |

OTHER PUBLICATIONS

International Search Report and Written Opinion dated Aug. 19, 2009 in PCT/KR2009/00698, filed Feb. 13, 2009.

International Search Report for PCT/KR2007/003172 dated on Nov. 19, 2007.

Babak Hassibi and Bertrand M. Hochwald, "How Much Training is Needed in Multiple-Antenna Wireless Links?", IEEE Transactions on Information Theory, vol. 49, No. 4, Apr. 2003.

Pengfei Xia et al., "Adaptive MIMO-OFDM Based on Partial Channel State Information", IEEE Transactions on signal processing, vol. 52, No. 1, Jan. 2004.

Pengfei Xia et al., "Achieving the Welch Bound With Difference Sets", IEEE Transactions on Information Theory, vol. 51, No. 5, May 2005.

G. David Forney, Jr., "Burst-Correcting Codes for the Classic Bursty Channel", IEEE Transactions on Cummunications Technology, vol. Com-19, No. 56, Oct. 1971.

Sinil Kim, et al., "Prolongation of Drug Exposure in Cerebrospinal Fluid by Encapsulation into DepoFoam", Cancer Research 53, 1596-1598, Apr. 1, 1993.

"Digital Video Broadcasting (DVB); Framing structure, channel coding and modulation for digital terrestrial television", ETSI EN 300 744, v1.4.1. (Jan. 2001).

* cited by examiner

"SYSTEM AND METHOD FOR ACQUIRING BEAMFORMING VECTORS USING TRAINING SEQUENCES WITH ADAPTIVE SPREADING GAINS"

CROSS-REFERENCE TO RELATED APPLICATIONS

This application claims the benefit under 35 U.S.C. 119(e) of U.S. Provisional Application No. 60/955,614, filed on Aug. 13, 2007, which is incorporated by reference in its entirety.

This application also relates to U.S. patent application Ser. No. 11/864,707, filed on Sep. 28, 2007, entitled "System and Method for Wireless Communication of Uncompressed High Definition Video Data Using a Beamforming Acquisition Protocol" and U.S. patent application Ser. No. 11/864,721, filed on Sep. 28, 2007, entitled "System and Method for Wireless Communication of Uncompressed High Definition Video Data Using a Transfer Matrix for Beamforming Estimation," which are herein incorporated by reference in their entirety. This application also relates to U.S. patent application Ser. No. 12/144,535, entitled "System and Method for Acquiring a Training Matrix for a Beamforming Acquisition Protocol Using a Butson Matrix," which is concurrently filed with this application and is incorporated herein by reference.

BACKGROUND

1. Field

The present invention relates to acquiring beamforming vectors, and in particular, to acquiring beamforming vectors for high-speed wireless data and video communications using antenna arrays at both transmitter and receiver.

2. Description of the Related Technology

With the proliferation of high quality video, an increasing number of electronic devices, such as consumer electronic devices, utilize high definition (HD) video which can require about 1 Gbps (gigabits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices, which do not have the bandwidth to carry the uncompressed HD signals, are connected together.

SUMMARY OF CERTAIN INVENTIVE ASPECTS

One aspect of the invention is a method of obtaining a source beamforming vector and a destination beamforming vector for transmission and reception of a data signal over a wireless communications channel, the method comprising modulating, at a first station, a first training sequence with a first source beamforming vector, wherein the first training sequence has a first spreading gain, transmitting, at the first station, the modulated first training sequence to a second station, receiving, at the second station, the modulated first training sequence, obtaining, at the second station, a first destination beamforming vector based on the received first training sequence, modulating, at the second station, a second training sequence with the first destination beamforming vector, wherein the second training sequence has a second spreading gain, transmitting, at the second station, the modulated second training sequence to the first station, receiving, at the first station, the modulated second training sequence, obtaining, at the first station, a second source beamforming vector based on the received second training sequence, modulating, at the first station, a third training sequence with the second source beamforming vector, wherein the third training sequence has a third spreading gain different from the first spreading gain, transmitting, at the first station, the modulated third training sequence to the second station, receiving, at the second station, the modulated third training sequence, obtaining, at the second station, a second destination beamforming vector based on the received third training sequence, modulating, at the second station, a fourth training sequence with the second destination beamforming vector, wherein the fourth training sequence has a fourth spreading gain different from the second spreading gain, transmitting, at the second station, the fourth training sequence to the first station, receiving, at the first station, the modulated fourth training sequence, obtaining, at the first station, a third source beamforming vector based on the received fourth training sequence, and determining, at the first station, whether to use the third source beamforming vector to modulate a data signal to be transmitted to the second station.

Another aspect of the invention is a system for obtaining a source beamforming vector and a destination beamforming vector for transmission and reception of a data signal over a wireless communications channel, the system comprising at least one transceiver, at least one memory configured to store a plurality of beamforming vectors, and at least one processor, being in data or signal communication with the at least one transceiver and memory, configured to i) modulate, at a first station, a first training sequence with a first source beamforming vector, wherein the first training sequence has a first spreading gain, ii) transmit, at the first station, the modulated first training sequence to a second station, iii) receive, at the second station, the modulated first training sequence, iv) obtain, at the second station, a first destination beamforming vector based on the received first training sequence, v) modulate, at the second station, a second training sequence with the first destination beamforming vector, wherein the second training sequence has a second spreading gain, vi) transmit, at the second station, the modulated second training sequence to the first station, vii) receive, at the first station, the modulated second training sequence, viii) obtain, at the first station, a second source beamforming vector based on the received second training sequence, ix) modulate, at the first station, a third training sequence with the second source beamforming vector, wherein the third training sequence has a third spreading gain different from the first spreading gain, x) transmit, at the first station, the modulated third training sequence to the second station, xi) receive, at the second station, the modulated third training sequence, xii) obtain, at the second station, a second destination beamforming vector based on the received third training sequence, xiii) modulate, at the second station, a fourth training sequence with the second destination beamforming vector, wherein the fourth training sequence has a fourth spreading gain different from the second spreading gain, xiv) transmit, at the second station, the fourth training sequence to the first station, xv) receive, at the first station, the modulated fourth training sequence, xvi) obtain, at the first station, a third source beamforming vector based on the received fourth training sequence, and xvii) determine, at the first station, whether to use the third source beamforming vector to modulate a data signal to be transmitted to the second station.

Another aspect of the invention is a method of obtaining a source beamforming vector for transmission of a data signal over a wireless communications channel, the method comprising i) modulating, at a first station, a first training sequence with a first source beamforming vector, wherein the first training sequence has a first spreading gain, ii) transmitting the modulated first training sequence to a second station, iii) receiving a first response signal from the second station, wherein the first response signal comprises a modulated second training sequence having a second spreading gain, iv) obtaining a second source beamforming vector based on the first response signal, v) modulating, at the first station, a third training sequence with the second source beamforming vector, wherein the third training signal has a third spreading gain which is different from the first spreading gain, vi) transmitting the modulated third training sequence to the second station, vii) receiving a second response signal from the second station, wherein the second response signal comprises a modulated fourth training sequence having a fourth spreading gain, viii) obtaining a third source beamforming vector based on the second response signal, and ix) determining whether to use the third source beamforming vector to modulate a data signal to be transmitted to the second station.

Another aspect of the invention is a system for obtaining a source beamforming vector for transmission of a data signal over a wireless communications channel, the system comprising at least one transceiver, a memory configured to store, at least, a first source beamforming vector, and a processor, being in data or signal communication with the at least one transceiver and the memory, configured to i) modulate a first training sequence with the first source beamforming vector, wherein the first training sequence has a first spreading gain, ii) transmit the modulated first training sequence via the at least one transceiver, iii) receive a first response signal via the at least one transceiver, wherein the first response signal comprises a modulated second training sequence having a second spreading gain, iv) obtain a second source beamforming vector based on the first response signal, v) modulate a third training sequence with the second source beamforming vector, wherein the third training sequence has a third spreading gain which is different from the first spreading gain, vi) transmit the modulated second training sequence via the at least one transceiver, vii) receive a second response signal via the at least one transceiver, wherein the second response signal comprises a fourth training sequence having a fourth spreading gain, viii) obtain a third source beamforming vector based on the second response signal, and ix) determine whether to use the third source beamforming vector to modulate a data signal to be transmitted.

Yet another aspect of the invention is a method of obtaining a destination beamforming vector for reception of a data signal over a wireless communications channel, the method comprising i) receiving a first modulated training sequence having a first spreading gain from a first station, ii) obtaining, at a second station, a first destination beamforming vector based on the first received training sequence, iii) modulating, at the second station, a first response signal with the first destination beamforming vector, wherein the first response signal comprises a second modulated training sequence having a second spreading gain, iv) transmitting the first response signal to the first station, v) receiving a third modulated training sequence from the first station, wherein the third modulated training sequence has a third spreading gain which is different from the first spreading gain, vi) obtaining a second destination beamforming vector based on the third received training signal, and vii) determining whether to use the second destination beamforming vector to demodulate a data signal transmitted from the first station.

Yet another aspect of the invention is a system for obtaining a destination beamforming vector for reception of a data signal over a wireless communications channel, the system comprising at least one transceiver, a memory configured to store, at least, a first destination beamforming vector, and a processor, being in data or signal communication with the at least one transceiver and the memory, configured to i) receive a first modulated training sequence having a first spreading gain from a first station, ii) obtain, at a second station, a first destination beamforming vector based on the first received training signal, iii) modulate, at the second station, a first response signal with the first destination beamforming vector, wherein the first response signal comprises a second modulated training sequence having a second spreading gain, iv) transmit the first response signal to a first station, v) receive a third modulated training sequence from the first station, wherein the third modulated training sequence has a second third spreading gain which is different from the first spreading gain, vi) obtain a second destination beamforming vector based on the third modulated training signal, and vii) determine whether to use the second destination beamforming vector to demodulate a data signal transmitted from the first station.

Still another aspect of the invention is a system for obtaining a source beamforming vector for transmission of a data signal over a wireless communications channel, the system comprising means for modulating, at a first station, a first training sequence with a first source beamforming vector, wherein the first training sequence has a first spreading gain, means for transmitting the modulated first training sequence to a second station, means for receiving a first response signal from the second station, wherein the first response signal comprises a second modulated training sequence having a second spreading gain, means for obtaining a second source beamforming vector based on the first response signal, means for modulating, at the first station, a third training sequence with the second source beamforming vector, wherein the third training signal has a third spreading gain which is different from the first spreading gain, means for transmitting the modulated third training sequence to the second station, means for receiving a second response signal from the second station, wherein the second response signal comprises a fourth training sequence having a fourth spreading gain, means for obtaining a third source beamforming vector based on the second response signal, and means for determining whether to use the third source beamforming vector to modulate a data signal to be transmitted to the second station.

Still another aspect of the invention is one or more processor-readable storage devices having processor-readable code, the processor-readable code which, when executed by one or more processors, performs a method of obtaining a destination beamforming vector for reception of a data signal over a wireless communications channel, the method comprising receiving a first modulated training sequence having a first spreading gain from a first station, obtaining, at a second station, a first destination beamforming vector based on the first modulated training signal, modulating, at the second station, a first response signal with the first destination beamforming vector, wherein the first response signal comprises a second modulated training sequence having a second spreading gain, transmitting the first response signal to a first station, receiving a third modulated training sequence from the first station, wherein the third modulated training sequence has a third spreading gain which is different from the first spreading gain, obtaining a second destination beamforming vector based on the third modulated training signal, and determining whether to use the second destination beamforming vector to demodulate a data signal transmitted from the first station.

Still another aspect of the invention is a method of obtaining a source beamforming vector for transmission of a data signal over a wireless communications channel, the method comprising modulating, at a first station, a training sequence with a first source beamforming vector, wherein the training sequence has a spreading gain, transmitting the modulated training sequence to a second station, receiving a response signal from the second station, obtaining a second source beamforming vector based on the response signal, and determining whether to use the most recently obtained beamforming vector to modulate a data signal to be transmitted to the second station, wherein if it is determined not to use the most recently obtained source beamforming vector, the modulating, transmitting, receiving, and obtaining are repeated with another training sequence having a different spreading gain.

Still another aspect of the invention is a method of obtaining a destination beamforming vector for reception of a data signal over a wireless communications channel, the method comprising receiving a modulated training sequence from a first station, wherein the training sequence has a spreading gain, obtaining, at a second station, a destination beamforming vector based on the modulated training sequence, modulating, at the second station, a response signal with the destination beamforming vector, transmitting the response signal to the first station, and determining whether to use the most recently obtained destination beamforming vector to demodulate a data signal transmitted from the first station, wherein if it determined not to use the most recently obtained destination beamforming vector, the receiving and obtaining are repeated with another training sequence having a different spreading gain.

DETAILED DESCRIPTION OF CERTAIN INVENTIVE EMBODIMENTS

System Overview

Figure 1:
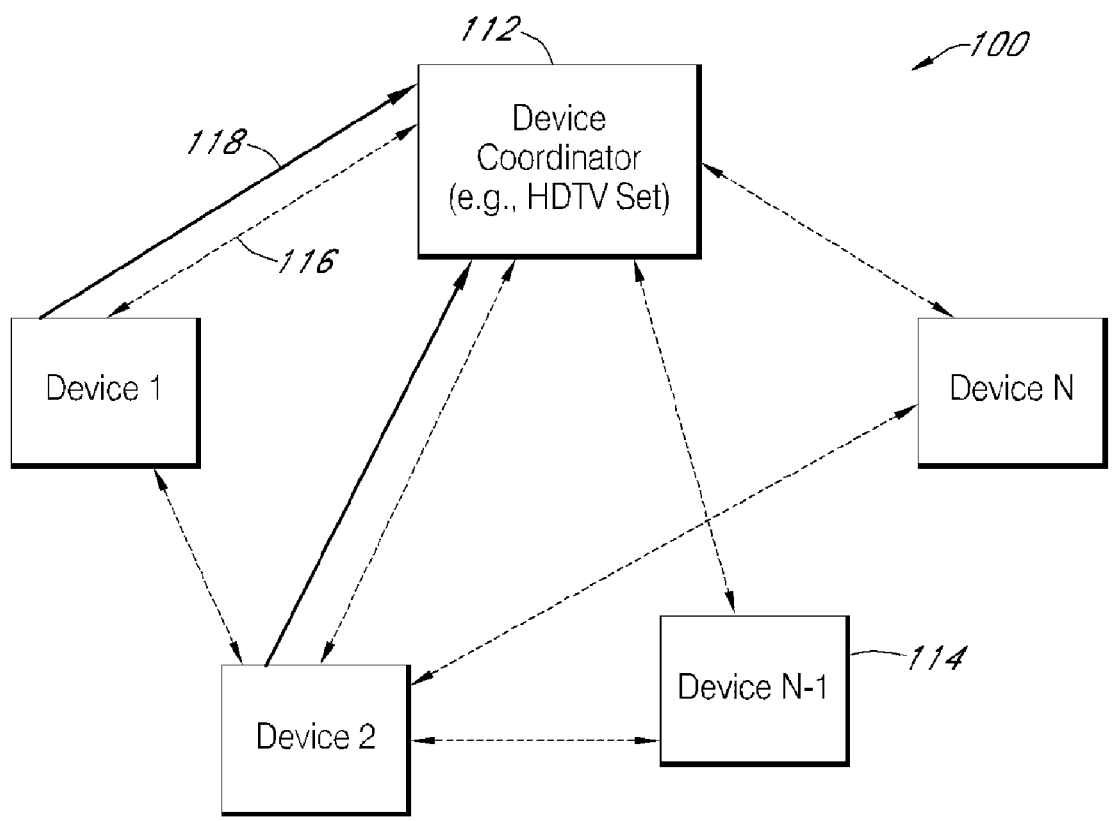
FIG. 1 is a functional block diagram of a wireless network that implements uncompressed HD video transmission between wireless devices according to one embodiment of the invention.

Example implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, Device 2, . . . , Device N). The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114.

Each station 114 uses the low-rate channel 116 for communications with other stations 114. The high-rate channel 118 supports single direction unicast transmission over directional beams established by beamforming, with e.g., multi-giga bps bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. In another embodiment, the receiver 112 may be a projector. The sender 114 can be a source of uncompressed video or audio. Examples of the sender 114 include a set-top box, a DVD player or recorder, digital camera, camcorder, other computing device (e.g., laptop, desktop, PDA, etc.) and so forth.

Figure 2:
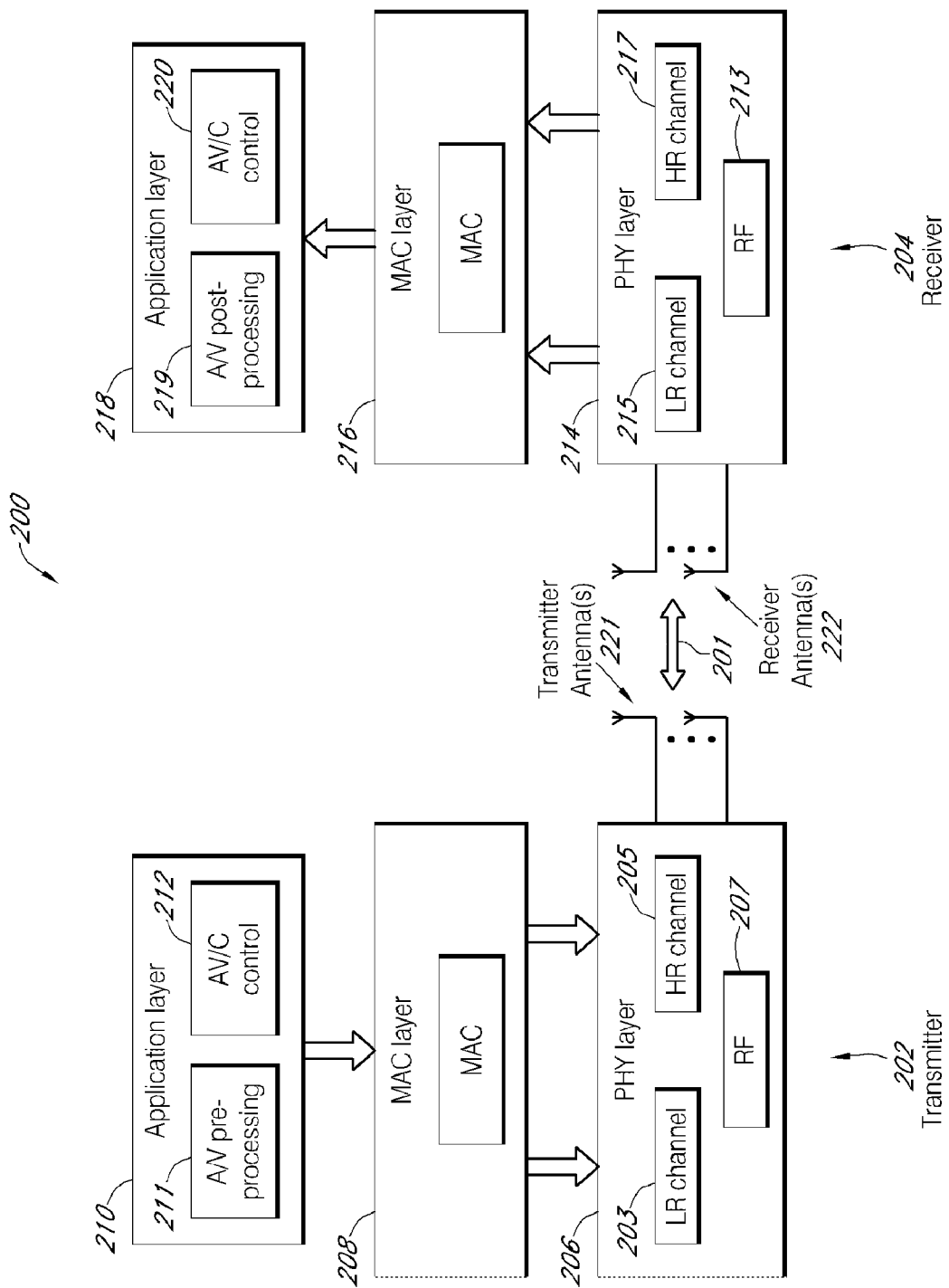
FIG. 2 is a functional block diagram of an example communication system for transmission of uncompressed HD video over a wireless communications channel, according to one embodiment of the invention.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless communications channel 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

General Beamforming

Transmit and/or receive beamforming has the potential of improving link quality substantially in wireless communications. For typical multiple-input/multiple-output (MIMO) systems, transmit and/or receiver beamforming are implemented in the digital domain, before a digital-to-analog conversion (DAC) operation at a transmitter side and after an analog-to-digital conversion (ADC) operation at a receiver side. The good performance of digitally beamformed systems comes at a cost of N+M RF chains, where N is the number of transmitter antennas and M is the number of receiver antennas. The cost may become formidable, especially when the sampling frequency increases. When cost-effectiveness becomes a dominant system design issue, analog beamforming is more favorable, as it generally requires only one RF chain.

Analog beamforming for MIMO orthogonal frequency division multiplex (OFDM) systems will be mainly described, while the same scheme can be applied to MIMO single carrier modulated systems as well. Suppose that K is the number of sub-carriers for OFDM modulation, N is the number of transmitter antennas, and M is the number of receiver antennas. Also, it is assumed that the transmit beamforming vector (hereinafter will be interchangeably referred to as "source beamforming vector") is $\vec{w}=[w_1, w_2, \ldots, w_N]^T$ and the receive beamforming vector (hereinafter will be interchangeably referred to as "destination beamforming vector") is $\vec{v}=[v_1, v_2, \ldots, v_N]^T$. Also, let L+1 be the maximum number of multipath channel taps for each pair of transmit and receive antennas. Without loss of generality, it is reasonable to have K>>L+1 (i.e., the number of OFDM sub-carriers is much greater than the maximum number of multipath channel taps between any pair of transmitter and receiver antennas). Further, let $\vec{h}_{ij}=[h_{ij}(0)\ h_{ij}(1)\ h_{ij}(2)\ \ldots\ h_{ij}(L)\ 0\ \ldots\ 0]^T$ be the multipath channel impulse response between the ith receive and jth transmit antenna, appended with zeros such that each vector $\vec{h}_{ij}$ is of size K×1. There are altogether M×N such channel vectors, with each one corresponding to one transmit and receive antenna pair. Let $S=\text{diag}(s_1, s_2, \ldots, s_K)$ be a diagonal matrix containing all the K data sub-carriers in an OFDM system. Thus, the transmitted vector (over an OFDM symbol duration) on a jth transmitter antenna after beamforming is $[w_j s_1, w_j s_2, \ldots, w_j s_K]$, for $j=1, 2, \ldots, N$. Because OFDM modulation diagonalizes the multipath channel, the received vector (over an OFDM symbol duration) on the ith receive antenna can be written as $$\vec{y}_i = \sum_{j=1}^{N} w_j S \vec{c}_{ij},$$

where $\vec{c}_{ij}=F_K \vec{h}_{ij}$ is the frequency channel response corresponding to the time-domain channel $\vec{h}_{ij}$, $w_j$ is the jth transmit beamforming coefficient, and $F_K$ is a K×K Fourier transform matrix.

At the receiver side, the received vectors $\vec{y}_i$ across all M receiver antennas will be combined by receive beamforming vectors $\vec{v}=[v_1, v_2, \ldots, v_N]^T$, where $v_i$ is the ith receive beamforming coefficient. For this reason, the combined signal vector can be written as $$\vec{z} = \sum_{i=1}^{M} v_i \vec{y}_i = \sum_{i=1}^{M} v_i \sum_{j=1}^{N} w_j S \vec{c}_{ij} = S \sum_{i=1}^{M} v_i \sum_{j=1}^{N} w_j \vec{c}_{ij}$$

$$\vec{z} = S \sum_{i=1}^{M} v_i A_i \vec{w}$$

$$\vec{z} = SA\vec{v}$$

where the K×N matrix $A_i$ is defined as $A_i=[\vec{c}_{i1}, \vec{c}_{i2}, \ldots, \vec{c}_{iN}]$, and the K×N matrix A is defined as $$A = \sum_{i=1}^{M} v_i A_i.$$

Similarly, the received signal vector can be written as $$\vec{z} = S \sum_{j=1}^{N} w_j \sum_{i=1}^{M} v_i \vec{c}_{ij}$$

$$\vec{z} = S \sum_{j=1}^{N} w_j B_j \vec{v}$$

$$\vec{z} = SB\vec{w}$$

where the K×M matrix $B_j$ is defined as $B_j=[\vec{c}_{1j}, \vec{c}_{2j}, \ldots, \vec{c}_{Mj}]$, and the K×M matrix B is defined as $$B = \sum_{j=1}^{N} w_j B_j.$$

To optimize the transmit and receive beamforming vectors, one embodiment of the invention finds the transmit and receive beamforming vectors that jointly minimize the pairwise error probability (PEP) between two arbitrary information codes. To obtain the above, one embodiment of the invention solves the following two problems simultaneously:

maximize $\vec{v}^H B^H B \vec{v}$ subject to $\|\vec{v}\|=1$ and maximize $\vec{w}^H A^H A \vec{w}$ subject to $\|\vec{w}\|=1$.

It is noticed that the matrix A is dependent upon vector $\vec{w}$, while the matrix B is dependent upon vector $\vec{v}$. For this reason, the above two problems cannot be solved easily.

Figure 3:
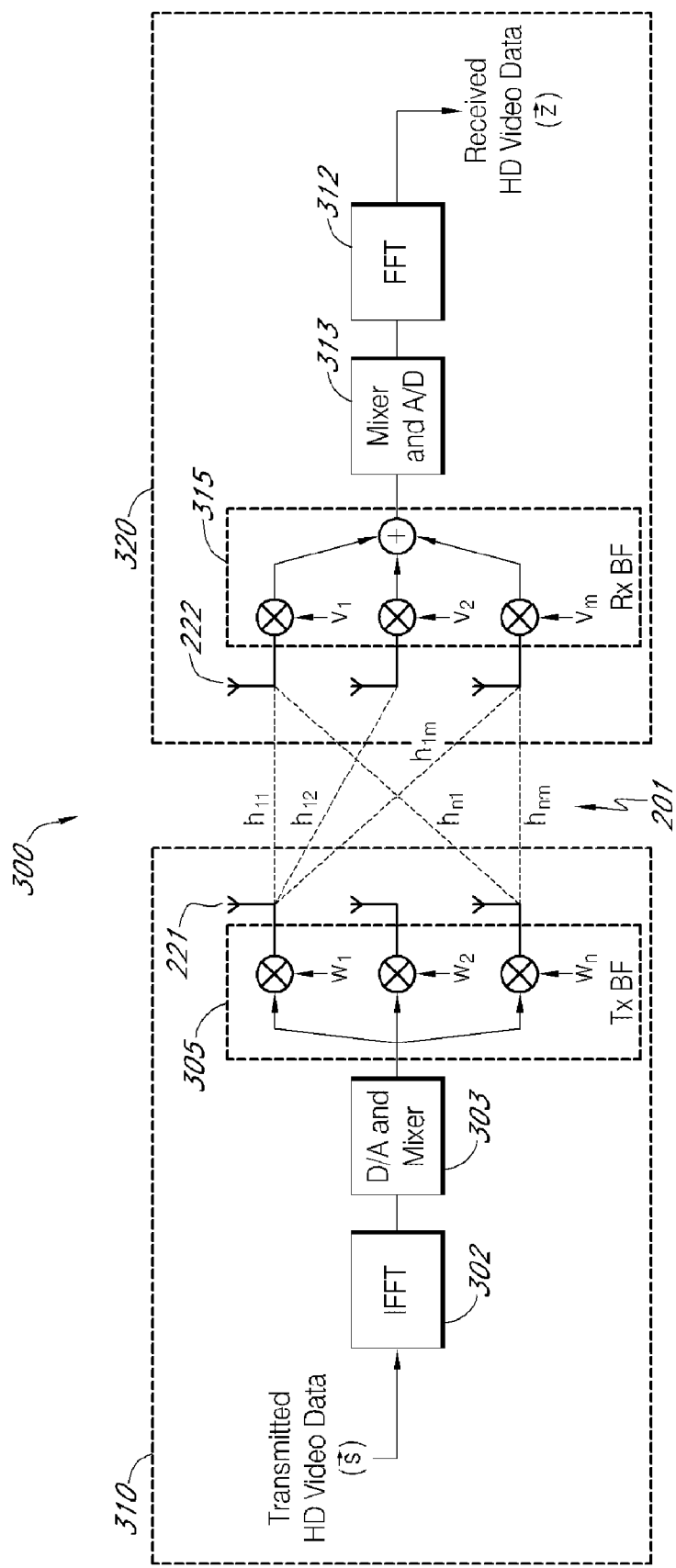
FIG. 3 is a diagram demonstrating an exemplary beamforming scheme of a wireless HD video communication system according to one embodiment of the invention.

FIG. 3 is a diagram demonstrating an exemplary beamforming scheme of a wireless HD video communication system, as applied to an MIMO OFDM system. The FIG. 3 scheme can also be applied for non-OFDM modulated schemes, such as single carrier modulated systems. In one embodiment, the system 300 is for the implementation of analog beamforming. The system 300 includes a transmitter 310 and a receiver 320. The transmitter 310 includes i) a module 302 which can perform an inverse Fourier transform, ii) a module 303 which can perform digital-to-analog conversion and mixing, iii) a transmitter beamformer 305, and iv) transmitter antennas 221. The receiver 320 includes i) a module 312 which can perform a Fourier transform, ii) a module 313 which can perform analog-to-digital conversion and mixing, iii) a receiver beamformer 315, and iv) receiver antennas 222. The transmitter 310 and receiver 320 can perform beamforming in conjunction with each other. It is appreciated that certain elements of the system 300 may be omitted, or combined with or incorporated into other elements of the system 300. In another embodiment, a certain element may be broken into a plurality of sub-elements. Also, the order of certain elements in the system 300 may change. In addition, certain elements, not shown in FIG. 3, may be added to the system 300. Furthermore, specific features of each element shown in FIG. 3 are merely examples and many other modifications may also be possible.

On the transmitter side, high definition (HD) video data, denoted by the vector $\vec{s}$, is input into the system 300. In one embodiment, the HD video data is uncompressed. After an inverse Fourier transform (IFFT) in the module 302, as well as digital-to-analog conversion and mixing in the module 303, the modified video data is input into the transmitter beamformer 305. The weights of the transmitter beamformer 305 are denoted by the variables $w_i$, for i=1, 2, ..., N, where N is the number of the transmitter antennas 221. After being weighted by the transmitter beamformer 305, the data is transmitted by the transmitter antennas 221 through the wireless channel 201, where it is received by the receiver antennas 222. The receiver beamformer 315 acts upon the received data to demodulate it. The weights of the receiver beamformer 315 are denoted by the variables $v_i$ for i=1, 2, ..., M, where M is the number of the receiver antennas 222. After being processed by the receiver beamformer 315, the received data is input through the mixer and analog-to-digital converter 313. Also, a Fourier transform is performed by the module 312 on the data to obtain the final received HD video data 311, denoted by the vector $\vec{z}$.

Figure 4:
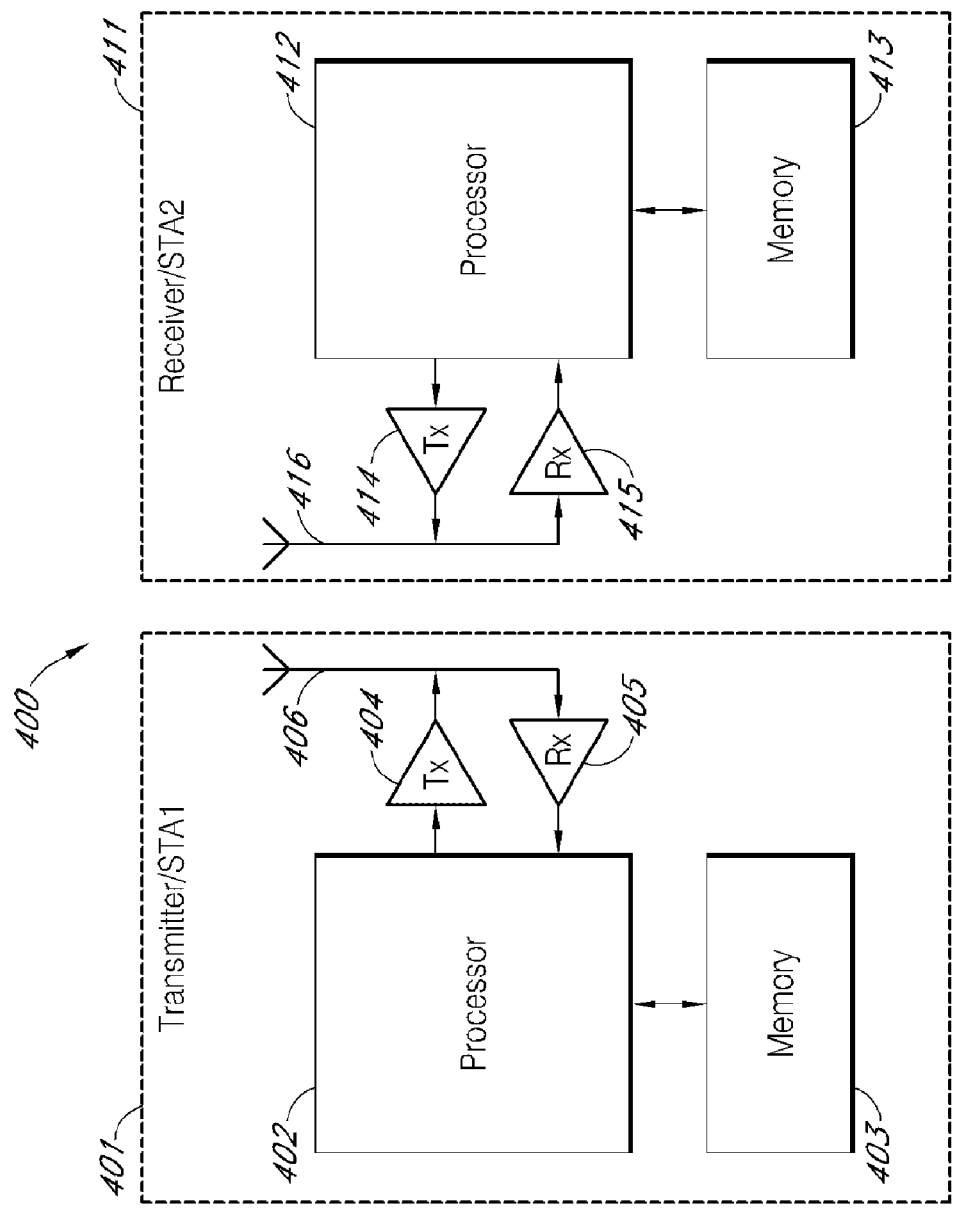
FIG. 4 is a block diagram illustrating the transmitter and receiver of a wireless HD video communication system according to one embodiment of the invention.

FIG. 4 is an exemplary block diagram illustrating the transmitter and receiver of a wireless HD video communication system according to one embodiment of the invention. A system 400 includes two stations, denoted by STA1 401 and STA2 411, respectively. Each station 401, 411 includes a processor 402, 412 as well as a memory for storage 403, 413. Each of the stations 401, 411 also includes a transceiver structure that further includes a transmitter 404, 414 and a receiver 405, 415 which connect to an antenna or set of antennas 406, 416. The system 400 may perform at least one of procedures 500, 550, 700, 750, and 900 shown in FIGS. 5a, 5b, 7a, 7b and 9 (described below in greater detail), for iteratively acquiring beamforming vectors.

In one embodiment, at least one of the procedures 500, 550, 700, 750, and 900 is implemented in a conventional programming language, such as C or C++ or another suitable programming language. In one embodiment of the invention, the program is stored on a computer accessible storage medium of the transmitter 401 and/or the receiver 411, for example, such as the memory 403 and/or 413. In another embodiment, the program can be stored in other system locations so long as it can perform at least one of the procedures 500, 550, 700, 750, and 900 according to embodiments of the invention. The storage medium may include any of a variety of technologies for storing information. In one embodiment, the storage medium includes a random access memory (RAM), hard disks, floppy disks, digital video devices, compact discs, video discs, and/or other optical storage mediums, etc.

In another embodiment, the processor 402 and/or 412 can be configured to or programmed to perform at least one of the procedures 500, 550, 700, 750, and 900. The program may be stored in the processor 402 and/or 412 or the memory 403 and/or 413. In various embodiments, the processor 402, 412 may have a configuration based on Intel Corporation's family of microprocessors, such as the Pentium family and Microsoft Corporation's Windows operating systems such as Windows 95/98/2000/XP or Windows NT. In one embodiment, the processor is implemented with a variety of computer platforms using a single chip or multichip microprocessors, digital signal processors, embedded microprocessors, microcontrollers, etc. In another embodiment, the processor is enabled by a wide range of operating systems such as Unix, Linux, Microsoft DOS, Microsoft Windows 2000/9x/ME/XP, Macintosh OS, OS/2 and the like. In another embodiment, at least one of the procedures 500, 550, 700, 750, and 900 can be implemented with embedded software or firmware.

Iteratively Acquiring Beamforming Vectors

Figure 5A:
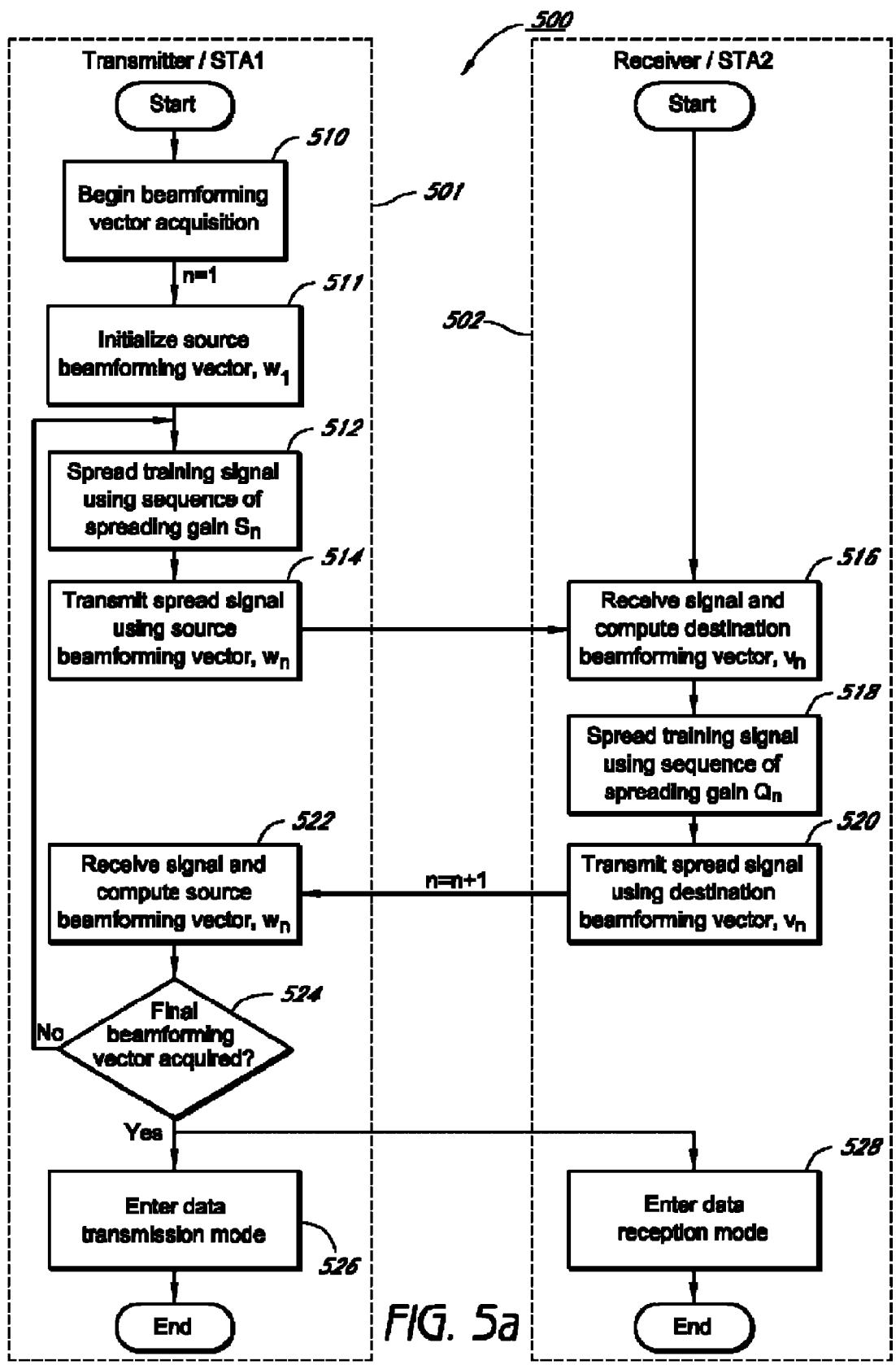
FIG. 5a is a flowchart which shows an exemplary iterative beamforming acquisition procedure according to one embodiment of the invention.

One embodiment provides a method of determining the transmit beamforming vector and the receive beamforming vector. FIG. 5a is an exemplary iterative beamforming acquisition procedure 500 according to one embodiment of the invention. Depending on the embodiments, additional states may be added, others removed, or the order of the states changes in FIG. 5a. This applies to the remaining schemes shown in FIGS. 5b, 7a, 7b and 8. This procedure 500 involves a transmitter 501 (also referred to as STA1, or source) and a receiver 502 (also referred to as STA2, or destination). The first stage for the transmitter 501 involves entering beamforming acquisition mode to begin beamforming vector acquisition (510).

At this point, since this is the first iteration, the iteration counting variable, n, is set to one. The transmitter initializes the source beamforming vector, $\vec{w}_1$ (511). The initialization may be chosen randomly, or the initial beamforming vector can be an omnidirectional beamforming vector. Other initialization methods may be used. The transmitter 501 spreads a training signal using a spreading sequence of spreading gain $S_n$ (512). Let $C_1$ be a spreading sequence of spreading gain $S_1$, wherein each element of the spreading sequence is chosen from $\{1, -1\}$ or from $\{1, -1, j, -j\}$. Then, if an element 1 in the training signal is to be transmitted, the whole sequence $C_1$ is transmitted. If an element -1 in the training signal is to be transmitted, the whole sequence $-C_1$ is to be transmitted. That is, the opposite of each element of the sequence $C_1$ is to be transmitted. Similarly, if the element j is to be transmitted, then the sequence $jC_1$ is to be transmitted. That is, a sequence comprising each element of the sequence $C_1$ is multiplied by the imaginary variable j. Finally, if the element -j is to be transmitted, then the sequence $-jC_1$ is to be transmitted. In one embodiment, for a given iteration, each element of the training signal is subjected to the same spreading sequence. In another embodiment, for a given iteration, the training signal transmitted from different antennas may be spread using different spreading sequences.

The transmitter transmits the spread training signal using the current source beamforming vector, $\vec{w}_n$ (514). In the first iteration, the source beamforming vector is the initialized transmit beamforming vector, $\vec{w}_1$. In later iterations, the source beamforming vector may be different. The receiver 502 receives this transmitted signal and based on this received signal computes a destination beamforming vector, $\vec{v}_n$ (516). In one embodiment, different algorithms can be used to compute the destination beamforming vector. In one embodiment, the receiver spreads a training signal using a spreading sequence of spreading gain $Q_n$ (518). In some embodiments, $S_n$ and $Q_n$ may be different spreading gains. The receiver 502 (STA2) then transmits the spread training signal back to STA1 501 using the calculated destination beamforming vector, $\vec{v}_n$ (520). At this point in the process, the iteration counting variable, n, is increased by one, i.e., n=n+1. STA1 601 receives the transmitted signal and computes a new source beamforming vector, $\vec{w}_n$ (522). In one embodiment, the transmitter 501 makes a determination as to whether or not the final source beamforming vector is acquired (524). In one embodiment, this determination may involve counting the number of times the source beamforming vector has been recalculated. In another embodiment, this determination may involve comparing the new source beamforming vector to previous source beamforming vectors.

If it is determined that the final source beamforming vector has not been acquired, stages 512, 514, 516, 518 520, 522, and 524 are repeated until it is determined that the final beamforming vectors have been acquired. When it has been determined that the final beamforming vectors have been acquired, the transmitter 501 then enters data transmission mode and begins to transmit HD video data (526). The receiver 502 enters data reception mode and begins to receive high definition video data (528).

Figure 5B:
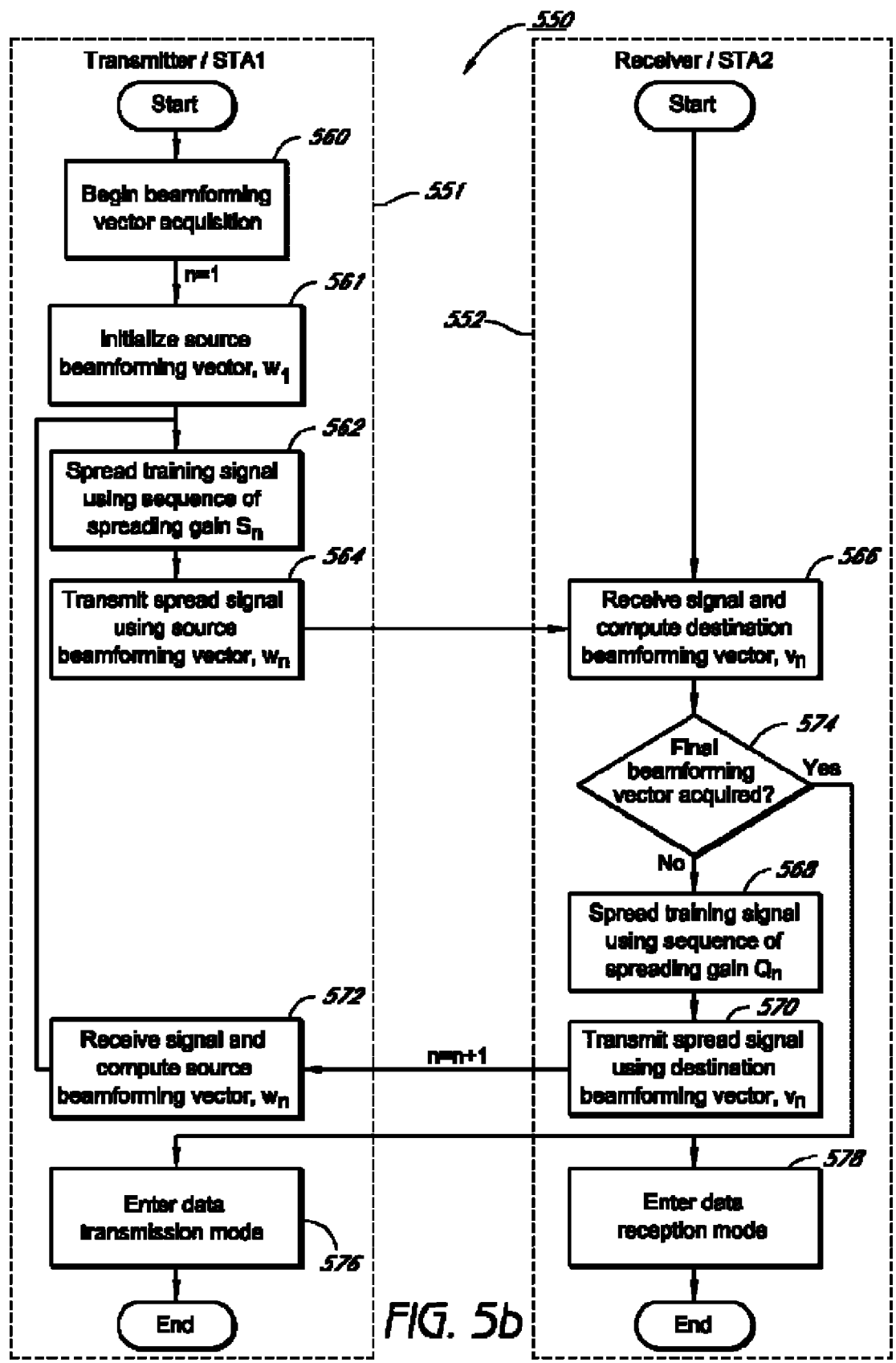
FIG. 5b is a flowchart which shows an exemplary iterative beamforming acquisition procedure according to another embodiment of the invention.

FIG. 5b is a flowchart which shows an exemplary iterative beamforming acquisition procedure 550 according to another embodiment of the invention. The main difference between the embodiments of FIGS. 5a and 5b is that the determining whether or not the final beamforming vectors are acquired is performed by the receiver in FIG. 5b. The first stage of the transmitter 551 is to enter beamforming acquisition mode to begin beamforming vector acquisition (560). The transmitter 551 then initializes the source beamforming vector, $\vec{w}_1$ (561). Then, the transmitter 551 spreads a training signal using a spreading sequence of spreading gain $S_n$ (562). The transmitter 551 uses the source beamforming vector to send the spread training signal to the receiver 552 (564). The receiver 552 receives the signal and uses it to compute the destination beamforming vector, $\vec{v}_n$ (566). It is determined in the receiver 552 whether or not the final source and destination beamforming vectors have been acquired (574). In one embodiment, the determination may include the number of times the source or destination beamforming vector has been computed. In another embodiment, the determination may include a comparison between the current source or destination beamforming vector and previous beamforming vectors. In another embodiment, the determination may involve setting a threshold for the signal-to-noise level and determining whether the current beamforming vectors would provide a signal-to-noise level above the threshold. If the source and destination beamforming vectors are not acquired, the receiver/STA2 552 spreads a training signal using a spreading sequence of spreading gain $Q_n$ (568) and transmits back to the transmitter/STA1 551 using the computed destination beamforming vector, $\vec{v}_n$ (570). STA1 551 then receives this signal and computes a new source beamforming vector, $\vec{w}_n$ (572). Stages 562, 564, and 566 are then repeated. A determination of whether or not the final source beamforming vector has been acquired is again performed (574), resulting in either a repetition of stages 568, 570, 572, 562, 564, and 566 or progressing to stages 576 and 578. Upon acquiring the final source beamforming vector, the transmitter 551 enters data transmission mode and begins to transmit HD video data (576). The receiver 552 enters data reception mode and begins to receive HD video data (578).

It can be noticed that acquisition of the source beamforming vector and the destination beamforming vector can take a few signal exchanges, and possibly take a long time. This may be unacceptable overhead if such a procedure is needed for each and every data packet. One embodiment uses such a procedure for each and every data packet. Alternatively, if the wireless channel is not changing, the procedure would not be needed for every packet.

Figure 6:
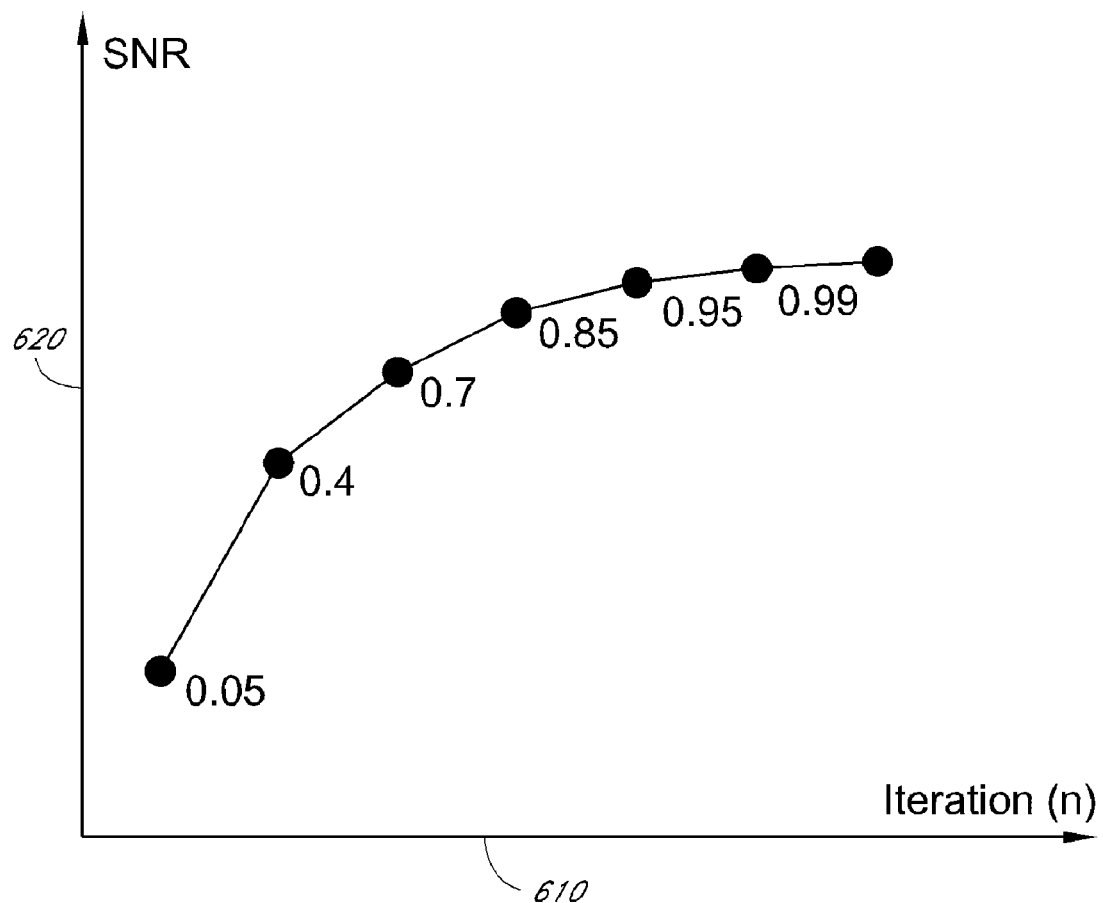
FIG. 6 is a diagram demonstrating the typical convergence behavior of signal-to-noise ratio as a function of iteration in an iterative beamforming acquisition procedure.

In one embodiment of the invention, the spreading sequence $C_n$ is the same for each iteration. In this embodiment, the spreading gain of $C_n$, i.e., $S_n$, is the same from iteration to iteration. FIG. 6 is a diagram demonstrating the typical convergence behavior of signal-to-noise ratio as a function of iteration in an iterative beamforming acquisition procedure. The axis of abscissas 610 of FIG. 6 shows the index of iterations (n), and the axis of ordinates 620 shows the achieved signal-to-noise ratio (SNR) enabled by the beamforming vectors of the nth iteration in linear scale. It may be noted that the achieved SNR saturates quickly as iteration progresses, corroborating the effectiveness of the iterative acquisition protocol. One method to take advantage of this fact is to apply a strong spreading gain (corresponding to a long spreading sequence) during the first stage to compensate for the relatively low SNR in the initial stage. As iteration progresses, one may use a relatively smaller spreading gain for later stages, as the beamforming vectors are more and more effective in themselves bridging the wireless link between the transmitter and receiver.

One embodiment of the invention is an iterative training protocol with an adaptive spreading scheme. During the n stages of the entire iteration protocol, each stage may employ a different spreading gain. In some embodiments, the first stage employs the largest spreading gain with the longest spreading sequence, while later stages employ a smaller spreading gain with shorter spreading sequences.

Figure 7A:
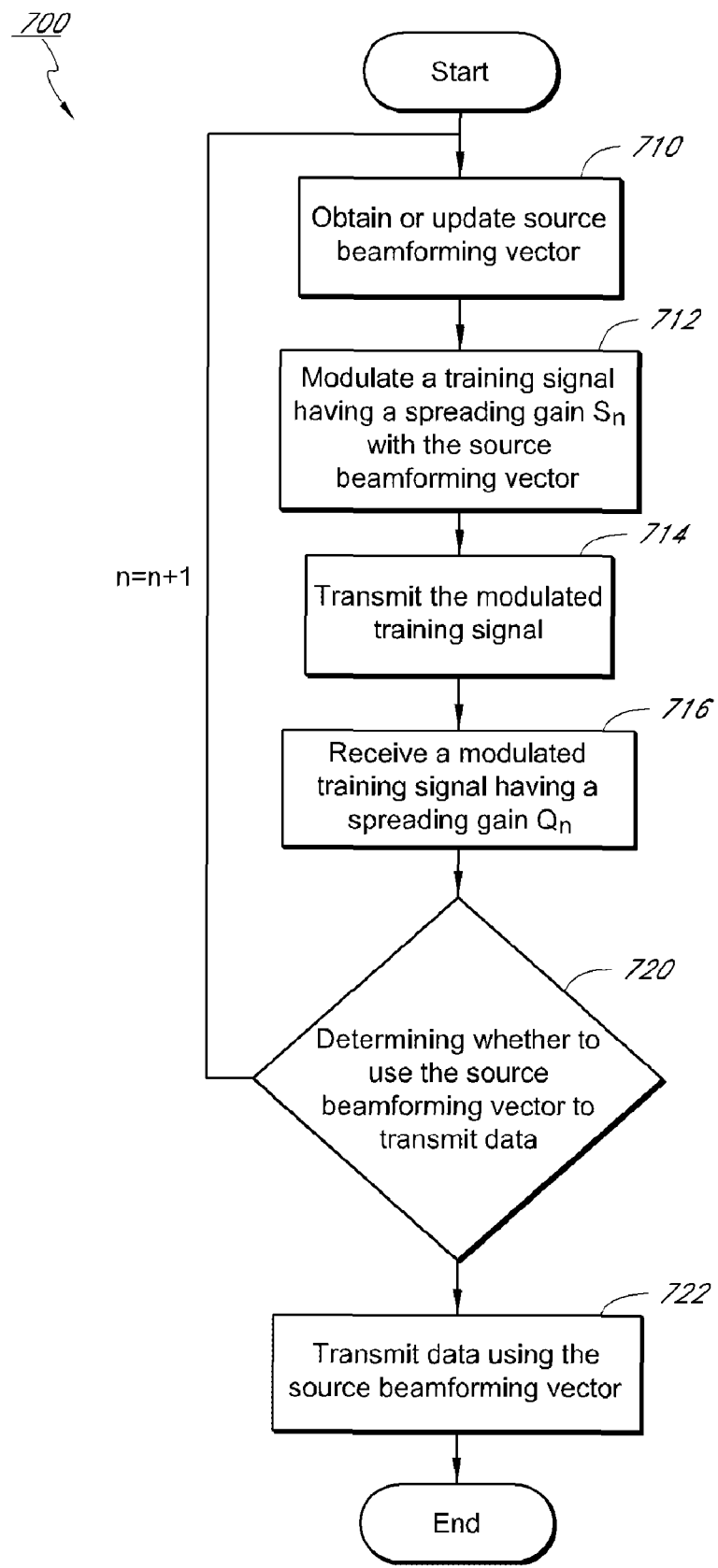
FIG. 7a is a flowchart which shows an exemplary iterative beamforming acquisition procedure from the point-of-view of a source of data.

FIG. 7a is a flowchart which shows an exemplary iterative beamforming acquisition procedure 700 from the point-of-view of a source of data. In the procedure 700, the eventual source of data obtains a source beamforming vector (710). This source beamforming vector is used to perform beamforming to modulate a training signal having a spreading gain of $S_n$ (712). After modulation, the modulated training signal is transmitted (714) to the eventual destination of data. A response signal, which may comprise a modulated training signal having a spreading gain of $Q_n$, is received (716) from, for example, the eventual destination of data. In other embodiments, a response signal is received (716) from a device which is not the eventual destination of data, for example, an antenna controlling device separated from the eventual destination of data. Once the response signal is received (716), a determination is made (720) whether or not to use the current source beamforming vector to transmit data. This determination may be done in a number of ways. For example, it may be determined to use the source beamforming vector if the number of iterations meets or exceeds some threshold. It may be determined to use the source beamforming vector if the current source beamforming vector is similar to a previously obtained source beamforming vector, indicating convergence of the iterative process. The determination may also be done by analyzing the response signal. If it is determined to use the source beamforming vector, the next stage of the process is to modulate data using the source beamforming vector and transmit the modulated data (722). If it is determined that the source beamforming vector should not be used, the process repeats by returning to stage 710 and obtaining a new source beamforming vector.

Figure 7B:
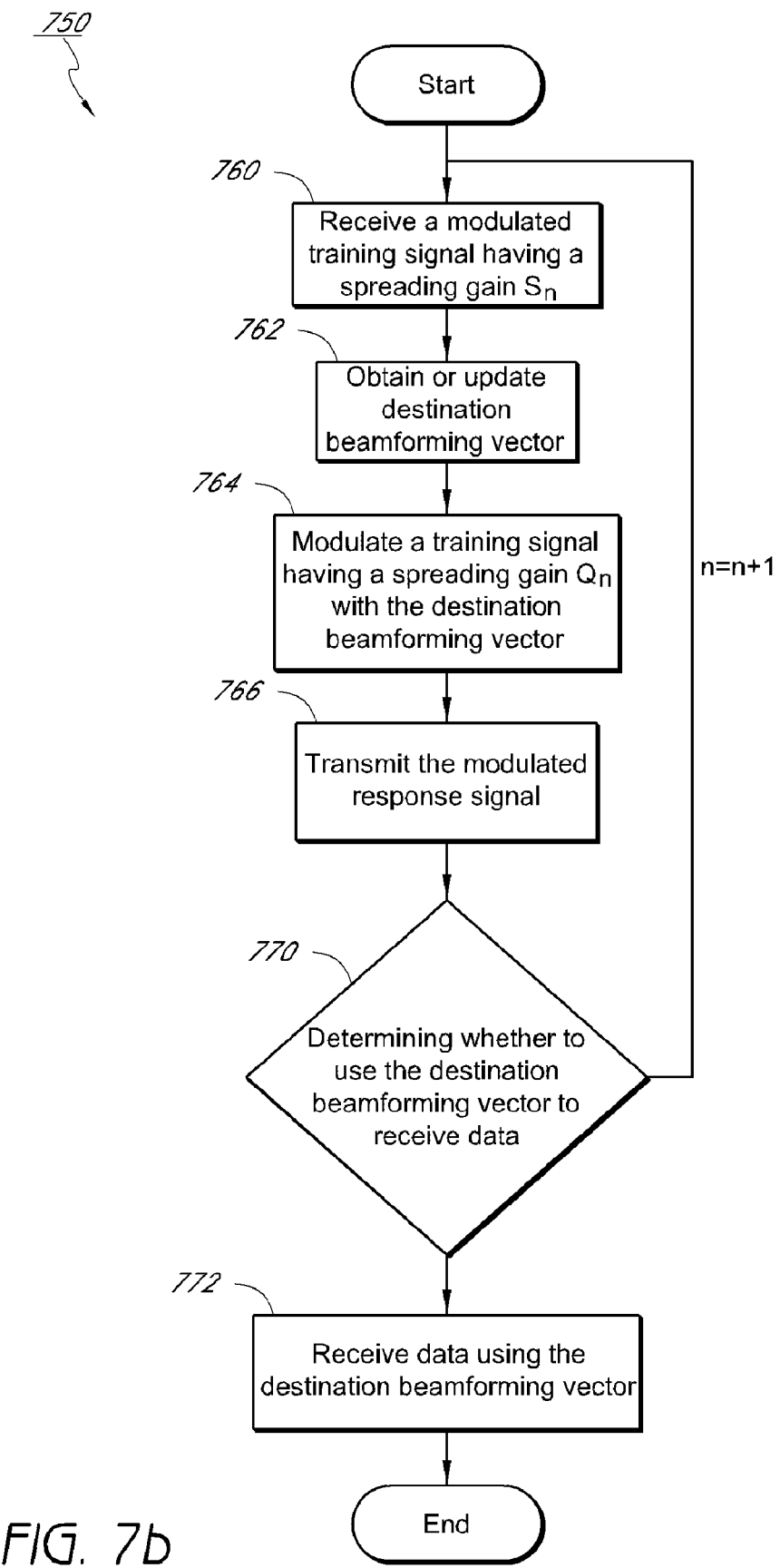
FIG. 7b is a flowchart which shows an exemplary iterative beamforming acquisition procedure from the point-of-view of a destination of data.

FIG. 7b is a flowchart which shows an exemplary iterative beamforming acquisition procedure 750 from the point-of-view of a destination of data. In the procedure 750, the eventual destination of data receives a modulated training signal (760). In some embodiments, the modulated training signal is received from the eventual source of data. Based on the training signal, the eventual destination of data obtains or updates a destination beamforming vector (762). The destination beamforming vector may be obtained in a number of ways. For example, the destination beamforming vector may be calculated using maximal ratio combining. In another embodiment, the destination beamforming vector can be selected from a finite set of candidate beamforming vectors. With the destination beamforming vector, a response signal, which may comprise a training sequence having a spreading gain of $Q_n$, is modulated (764). In some embodiments, the response signal bears resemblance to the training signals transmitted by the eventual source of data. The response signal is transmitted (766) and it is determined whether to use the destination beamforming vector to receive data (770). As described above in reference to the transmitter, the determining may be performed in a number of ways. If it is determined to use the destination beamforming vector, the next stage of the process is to demodulate received data using the destination beamforming vector (772). If it is determined that the destination beamforming vector should not be used, the process repeats by returning to stage 770 and receiving a modulated training signal.

The calculation of $S_n$ for use in spreading the training sequence for each iteration may be done in a number of ways. In some embodiments, the number is pre-programmed within the transmitter and/or receiver. In another embodiment, after each iteration, the receiver may feedback to the transmitter an estimate of the overall SNR improvement relative to the previous stage, which may be denoted by K. This value, K, would be the maximum possible spreading gain deduction ratio. That is, the spreading gain of the spreading sequence of the next iteration may be proportional or inversely proportional to K. This feedback may be transmitted on top of any other feedback, if any.

For example, in an iterative beamforming acquisition process with four iterations, there may be a three-fold gain in SNR on the second iteration relative to the first iteration. In the embodiment in which the spreading gain is fixed, the four iterations would require time and power on the order of four times the spreading gain of the initial spreading sequence, i.e. $4S_1$. In the embodiment in which the spreading gain is variable, due to the three-fold gain in SNR, the spreading gain of the second, third, and fourth iterations would be one-third the spreading gain of the initial spreading sequence (or less). Thus, the time and power consumed would be on the order of two times the spreading gain of the initial spreading sequence, i.e. $2S_1$, achieving about 50% savings in time and power without sacrificing the acquisition performance. Furthermore, at least one embodiment can significantly improve the efficiency of the existing training protocols.

This technology can be applied to most iterative antenna training protocol and can safely coexist with most other technologies.

While the above description has pointed out novel features of the invention as applied to various embodiments, the skilled person will understand that various omissions, substitutions, and changes in the form and details of the device or process illustrated may be made without departing from the scope of the invention. For example, although embodiments of the invention have been described with reference to uncompressed video data, those embodiments can be applied to compressed video data as well. Embodiments of the invention can also be applied to non-video data. Therefore, the scope of the invention is defined by the appended claims rather than by the foregoing description. All variations coming within the meaning and range of equivalency of the claims are embraced within their scope.

What is claimed is:

1. A method of obtaining a source beamforming vector and a destination beamforming vector for transmission and reception of a data signal over a wireless communications channel, the method comprising:
   i) modulating, at a first station, a first training sequence with a first source beamforming vector, wherein the first training sequence has a first spreading gain;
   ii) transmitting, at the first station, the modulated first training sequence to a second station;
   iii) receiving, at the second station, the modulated first training sequence;
   iv) obtaining, at the second station, a first destination beamforming vector based on the received first training sequence;
   v) modulating, at the second station, a second training sequence with the first destination beamforming vector, wherein the second training sequence has a second spreading gain;

vi) transmitting, at the second station, the modulated second training sequence to the first station;
vii) receiving, at the first station, the modulated second training sequence;
viii) obtaining, at the first station, a second source beamforming vector based on the received second training sequence;
ix) modulating, at the first station, a third training sequence with the second source beamforming vector, wherein the third training sequence has a third spreading gain different from the first spreading gain;
x) transmitting, at the first station, the modulated third training sequence to the second station;
xi) receiving, at the second station, the modulated third training sequence;
xii) obtaining, at the second station, a second destination beamforming vector based on the received third training sequence;
xiii) modulating, at the second station, a fourth training sequence with the second destination beamforming vector, wherein the fourth training sequence has a fourth spreading gain different from the second spreading gain;
xiv) transmitting, at the second station, the fourth training sequence to the first station;
xv) receiving, at the first station, the modulated fourth training sequence;
xvi) obtaining, at the first station, a third source beamforming vector based on the received fourth training sequence; and
xvii) determining, at the first station, whether to use the third source beamforming vector to modulate a data signal to be transmitted to the second station,
wherein ix)-xvii) are repeated until it is determined to use the most recently obtained source beamforming vector to modulate a data signal to be transmitted to the second station and to use the most recently obtained destination beamforming vector to demodulate the data signal.

2. The method of claim 1, wherein the spreading gains have at least one of the following relationships: i) the second spreading gain is different from the first spreading gain, ii) the third spreading gain is different than the first spreading gain, and iii) the fourth spreading gain is different from the second spreading gain.

3. A system for obtaining a source beamforming vector and a destination beamforming vector for transmission and reception of a data signal over a wireless communications channel, the system comprising:
at least one transceiver; at least one memory configured to store a plurality of beamforming vectors; and
at least one processor, being in data or signal communication with the at least one transceiver and memory, configured to:
  i) modulate, at a first station, a first training sequence with a first source beamforming vector, wherein the first training sequence has a first spreading gain;
  ii) transmit, at the first station, the modulated first training sequence to a second station;
  iii) receive, at the second station, the modulated first training sequence;
  iv) obtain, at the second station, a first destination beamforming vector based on the received first training sequence;
  v) modulate, at the second station, a second training sequence with the first destination beamforming vector, wherein the second training sequence has a second spreading gain;
  vi) transmit, at the second station, the modulated second training sequence to the first station;
  vii) receive, at the first station, the modulated second training sequence;
  viii) obtain, at the first station, a second source beamforming vector based on the received second training sequence;
  ix) modulate, at the first station, a third training sequence with the second source beamforming vector, wherein the third training sequence has a third spreading gain different from the first spreading gain;
  x) transmit, at the first station, the modulated third training sequence to the second station;
  xi) receive, at the second station, the modulated third training sequence;
  xii) obtain, at the second station, a second destination beamforming vector based on the received third training sequence;
  xiii) modulate, at the second station, a fourth training sequence with the second destination beamforming vector, wherein the fourth training sequence has a fourth spreading gain different from the second spreading gain;
  xiv) transmit, at the second station, the fourth training sequence to the first station;
  xv) receive, at the first station, the modulated fourth training sequence;
  xvi) obtain, at the first station, a third source beamforming vector based on the received fourth training sequence; and
  xvii) determine, at the first station, whether to use the third source beamforming vector to modulate a data signal to be transmitted to the second station,
  wherein the processor is further configured to repeat ix)-xvii) until it is determined to use the most recently obtained source beamforming vector to modulate a data signal to be transmitted to the second station and to use the most recently obtained destination beamforming vector to demodulate the data signal.

4. The system of claim 3, wherein the spreading gains have at least one of the following relationships: i) the second spreading gain is different from the first spreading gain, ii) the third spreading gain is different than the first spreading gain, and iii) the fourth spreading gain is different from the second spreading gain.

5. A method of obtaining a source beamforming vector for transmission of a data signal over a wireless communications channel, the method comprising:
  i) modulating, at a first station, a first training sequence with a first source beamforming vector, wherein the first training sequence has a first spreading gain;
  ii) transmitting the modulated first training sequence to a second station;
  iii) receiving a first response signal from the second station, wherein the first response signal comprises a modulated second training sequence having a second spreading gain;
  iv) obtaining a second source beamforming vector based on the first response signal;
  v) modulating, at the first station, a third training sequence with the second source beamforming vector, wherein the third training signal has a third spreading gain which is different from the first spreading gain;
  vi) transmitting the modulated third training sequence to the second station;

vii) receiving a second response signal from the second station, wherein the second response signal comprises a modulated fourth training sequence having a fourth spreading gain;

viii) obtaining a third source beamforming vector based on the second response signal; and ix) determining whether to use the third source beamforming vector to modulate a data signal to be transmitted to the second station, wherein v)-ix) are repeated until it is determined to use the most recently obtained source beamforming vector to modulate a data signal to be transmitted to the second station.

6. The method of claim 5, wherein the spreading gains have at least one of the following relationships: i) the second spreading gain is different from the first spreading gain, ii) the third spreading gain is different than the first spreading gain, and iii) the fourth spreading gain is different from the second spreading gain.

7. The method of claim 5, wherein the third spreading gain is determined, at least in part, based on the first response signal.

8. The method of claim 5, wherein the determining comprises comparing i) a metric obtained using an obtained source beamforming vector and ii) a metric obtained using a previously-obtained source beamforming vector.

9. The method of claim 5, wherein the determining comprises receiving a determining signal from the second station, and wherein the determining signal comprises an indication of whether or not to use the third source beamforming vector for transmitting a data signal to the second station.

10. The method of claim 5, wherein the data signal is a high definition video data signal.

11. The method of claim 10, wherein the high definition video data is uncompressed.

12. A system for obtaining a source beamforming vector for transmission of a data signal over a wireless communications channel, the system comprising:
  at least one transceiver;
  a memory configured to store, at least, a first source beamforming vector; and
  a processor, being in data or signal communication with the at least one transceiver and the memory, configured to:
    i) modulate a first training sequence with the first source beamforming vector, wherein the first training sequence has a first spreading gain;
    ii) transmit the modulated first training sequence via the at least one transceiver;
    iii) receive a first response signal via the at least one transceiver, wherein the first response signal comprises a modulated second training sequence having a second spreading gain;
    iv) obtain a second source beamforming vector based on the first response signal;
    v) modulate a third training sequence with the second source beamforming vector, wherein the third training sequence has a third spreading gain which is different from the first spreading gain;
    vi) transmit the modulated second training sequence via the at least one transceiver;
    vii) receive a second response signal via the at least one transceiver, wherein the second response signal comprises a fourth training sequence having a fourth spreading gain;
    viii) obtain a third source beamforming vector based on the second response signal; and
    ix) determine whether to use the third source beamforming vector to modulate a data signal to be transmitted, wherein the processor is further configured to repeat v)-ix) until it is determined to use the most recently obtained source beamforming vector to modulate a data signal to be transmitted.

13. The system of claim 12, wherein the spreading gains have at least one of the following relationships: i) the second spreading gain is different from the first spreading gain, ii) the third spreading gain is different than the first spreading gain, and iii) the fourth spreading gain is different from the second spreading gain.

14. The system of claim 12, wherein the system is implemented with one of the following: a HDTV set, a projector, a computing device, a set-top box, a DVD player or recorder, a digital camera, a camcorder and a computer device.

15. The system of claim 12, wherein at least one of the memory and the processor is contained within the transceiver.

16. A method of obtaining a destination beamforming vector for reception of a data signal over a wireless communications channel, the method comprising:
  i) receiving a first modulated training sequence having a first spreading gain from a first station;
  ii) obtaining, at a second station, a first destination beamforming vector based on the first modulated training sequence;
  iii) modulating, at the second station, a first response signal with the first destination beamforming vector, wherein the first response signal comprises a second modulated training sequence having a second spreading gain;
  iv) transmitting the first response signal to the first station;
  v) receiving a third modulated training sequence from the first station, wherein the third modulated training sequence has a third spreading gain which is different from the first spreading gain;
  vi) obtaining a second destination beamforming vector based on the third modulated training signal; and
  vii) determining whether to use the second destination beamforming vector to demodulate a data signal transmitted from the first station,
  wherein iii)-vii) are repeated until it is determined to use the most recently obtained destination beamforming vector to demodulate a data signal received from the first station.

17. The method of claim 16, wherein the spreading gains have at least one of the following relationships: i) the second spreading gain is different from the first spreading gain, ii) the third spreading gain is different than the first spreading gain, and iii) the fourth spreading gain is different from the second spreading gain.

18. A system for obtaining a destination beamforming vector for reception of a data signal over a wireless communications channel, the system comprising:
  at least one transceiver; a memory configured to store, at least, a first destination beamforming vector; and
  a processor, being in data or signal communication with the at least one transceiver and the memory, configured to:
    i) receive a first modulated training sequence having a first spreading gain from a first station;
    ii) obtain, at a second station, a first destination beamforming vector based on the first modulated training signal;
    iii) modulate, at the second station, a first response signal with the first destination beamforming vector, wherein the first response signal comprises a second modulated training sequence having a second spreading gain;
    iv) transmit the first response signal to a first station;

v) receive a third modulated training sequence from the first station, wherein the third modulated training sequence has a third spreading gain which is different from the first spreading gain;

vi) obtain a second destination beamforming vector based on the third modulated training signal; and vii) determine whether to use the second destination beamforming vector to demodulate a data signal transmitted from the first station, wherein the processor is further configured to repeat iii)-vii) until it is determined to use the most recently obtained destination beamforming vector to demodulate a data signal received from the first station.

19. The system of claim 18, wherein the spreading gains have at least one of the following relationships: i) the second spreading gain is different from the first spreading gain, ii) the third spreading gain is different than the first spreading gain, and iii) the fourth spreading gain is different from the second spreading gain.

20. A system for obtaining a source beamforming vector for transmission of a data signal over a wireless communications channel, the system comprising:

means for modulating, at a first station, a first training sequence with a first source beamforming vector, wherein the first training sequence has a first spreading gain;

means for transmitting the modulated first training sequence to a second station;

means for receiving a first response signal from the second station, wherein the first response signal comprises a second modulated training sequence having a second spreading gain;

means for obtaining a second source beamforming vector based on the first response signal;

means for modulating, at the first station, a third training sequence with the second source beamforming vector, wherein the third training signal has a third spreading gain which is different from the first spreading gain;

means for transmitting the modulated third training sequence to the second station;

means for receiving a second response signal from the second station, wherein the second response signal comprises a fourth training sequence having a fourth spreading gain;

means for obtaining a third source beamforming vector based on the second response signal; and means for determining whether to use the third source beamforming vector to modulate a data signal to be transmitted to the second station wherein the spreading gains have at least one of the following relationships: i) the second spreading gain is different from the first spreading gain, ii) the third spreading gain is different than the first spreading gain, and iii) the fourth spreading gain is different from the second spreading gain and the receiving and obtaining are repeated with another training sequence having a different spreading gain until the first station is determined to use the most recently obtained destination beamforming vector to demodulate a data signal received from the first station.

21. One or more non-transitory processor-readable storage devices having processor-readable code, the processor-readable code which, when executed by one or more processors, performs a method of obtaining a destination beamforming vector for reception of a data signal over a wireless communications channel, the method comprising:

receiving a first modulated training sequence having a first spreading gain from a first station;

obtaining, at a second station, a first destination beamforming vector based on the first modulated training signal;

modulating, at the second station, a first response signal with the first destination beamforming vector, wherein the first response signal comprises a second modulated training sequence having a second spreading gain;

transmitting the first response signal to a first station;

receiving a third modulated training sequence from the first station, wherein the third modulated training sequence has a third spreading gain which is different from the first spreading gain; obtaining a second destination beamforming vector based on the third modulated training signal; and determining whether to use the second destination beamforming vector to demodulate a data signal transmitted from the first station wherein the spreading gains have at least one of the following relationships: i) the second spreading gain is different from the first spreading gain, ii) the third spreading gain is different than the first spreading gain, and iii) the fourth spreading gain is different from the second spreading gain and the receiving and obtaining are repeated with another training sequence having a different spreading gain until the first station is determined to use the most recently obtained destination beamforming vector to demodulate a data signal received from the first station.

22. A method of obtaining a source beamforming vector for transmission of a data signal over a wireless communications channel, the method comprising:

modulating, at a first station, a training sequence with a first source beamforming vector, wherein the training sequence has a spreading gain;

transmitting the modulated training sequence to a second station; receiving a response signal from the second station; obtaining a second source beamforming vector based on the response signal; and determining whether to use the most recently obtained beamforming vector to modulate a data signal to be transmitted to the second station, wherein if the first station is determined not to use the most recently obtained source beamforming vector, the modulating, transmitting, receiving, and obtaining are repeated with another training sequence having a different spreading gain until the first station is determined to use the most recently obtained destination beamforming vector to demodulate a data signal received from the first station.

23. A method of obtaining a destination beamforming vector for reception of a data signal over a wireless communications channel, the method comprising:

receiving a modulated training sequence from a first station, wherein the training sequence has a spreading gain;

obtaining, at a second station, the destination beamforming vector based on the modulated training sequence;

modulating, at the second station, a response signal with the destination beamforming vector;

transmitting the response signal to the first station; and determining whether to use the most recently obtained destination beamforming vector to demodulate a data signal transmitted from the first station, wherein if the first station determined not to use the most recently obtained destination beamforming vector, the receiving and obtaining are repeated with another training sequence having a different spreading gain until the first station is determined to use the most recently obtained destination beamforming vector to demodulate a data signal received from the first station.

* * * * *